(12) United States Patent
Wang et al.

(10) Patent No.: US 9,996,431 B2
(45) Date of Patent: Jun. 12, 2018

(54) ARCHITECTURE AND APPARATUS FOR ADVANCED ARBITRATION IN EMBEDDED CONTROLS

(71) Applicant: GM GLOBAL TECHNOLOGY OPERATIONS LLC, Detroit, MI (US)

(72) Inventors: Shige Wang, Northville, MI (US); Xiaofeng F. Song, Novi, MI (US); Xian Zhang, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

(21) Appl. No.: 15/078,255

(22) Filed: Mar. 23, 2016

(65) Prior Publication Data

US 2017/0277604 A1     Sep. 28, 2017

(51) Int. Cl.
    *G06F 11/10*     (2006.01)
    *G06F 11/18*     (2006.01)
    *G05B 19/042*    (2006.01)

(52) U.S. Cl.
    CPC ........ *G06F 11/182* (2013.01); *G05B 19/0421* (2013.01); *G06F 2201/805* (2013.01); *G06F 2201/82* (2013.01)

(58) Field of Classification Search
    CPC . G06F 11/182; G06F 11/183; G05B 19/0421; G05B 19/03
    See application file for complete search history.

(56) References Cited

U.S. PATENT DOCUMENTS

| | | | | |
|---|---|---|---|---|
| 5,210,871 A * | 5/1993 | Lala | ........................ | G06F 9/52 710/116 |
| 5,984,504 A * | 11/1999 | Doyle | ...................... | G05B 9/03 376/216 |
| 6,029,217 A | 2/2000 | Arimilli et al. | | |
| 6,449,732 B1 * | 9/2002 | Rasmussen | .............. | G05B 9/03 713/400 |
| 7,454,546 B1 | 11/2008 | Lilley | | |
| 8,824,496 B2 | 9/2014 | Koka et al. | | |
| 2007/0192542 A1 * | 8/2007 | Frolund | .............. | G06F 11/1064 711/119 |
| 2008/0140962 A1 * | 6/2008 | Pattabiraman | ........ | G06F 11/167 711/162 |
| 2012/0216037 A1 * | 8/2012 | Simcoe | ................ | H04L 9/3236 713/168 |
| 2013/0304793 A1 * | 11/2013 | Sasaki | .................. | G06F 11/182 709/201 |
| 2014/0082331 A1 * | 3/2014 | Smith, II | .............. | G06F 9/4887 712/220 |

\* cited by examiner

*Primary Examiner* — Yolanda L Wilson
(74) *Attorney, Agent, or Firm* — Quinn IP Law (57) ABSTRACT

A method of arbitrating conflicting outputs in a redundant control system. Execution data of a task executed by each controller in the redundant control system is recorded. The execution data includes an initial timestamp of each execution stream, identification of critical functions in each execution stream, and parameter values used by the critical functions. A path executed by each controller is identified based only on the critical functions executed for each execution stream. The recorded execution data of each executed path is applied to an arbitration module. An output result from one of the respective controllers selecting, by an arbitration module, based on the recorded execution data of each executed path. The output result of the selected controller is communicated to a next module for further processing.

20 Claims, 6 Drawing Sheets

ARCHITECTURE AND APPARATUS FOR ADVANCED ARBITRATION IN EMBEDDED CONTROLS

BACKGROUND OF INVENTION

An embodiment relates to object arbitration for control systems.

Systems which provide safety functions typically utilize redundant controllers to ensure that operation of such functions can be maintained in the event of a failure. In control systems, data is provided to a controller or similar and tasks are executed based on the input data. It is not uncommon for multiple processors or a multi-core processor to execute a same function for redundancy purposes, which can assist in determining whether a fault is present in the output results of the executed function. However, when conflicting results are output from the different processors or the multi-core processor executing the same function, arbitration is performed to determine which results should be utilized. For control systems that utilize an odd number of processors, the result associated with the majority wins out. However, if an even number of processors is used, then a split decision is present. Systems without a robust arbitration technique may just use the output result of the designated master. However, the issue is the result from the designated master could be the fault controller or core resulting in incorrect control actions as a result of the utilizing the results with the errors. In addition, the amount of information that may have to be obtained and recorded from the various redundant processing can be large and computationally intensive.

SUMMARY OF INVENTION

An advantage of an embodiment is the selection of an output result of a function executed by multiple processor or by multiply cores in a processor in a redundant control system. The technique described herein not only determines which output result should be selected for further processing, but efficiently reduces that amount of data utilized by only recording critical functions and parameter values used by critical functions. Each task executed is identified by a respective path. The paths are identified as a function of identifying critical functions that are executed during the task. Parameter values are also recorded only for those critical functions executed. In addition, a bit vector is generated that uniquely identifies the path where each bit vector includes all the critical functions. A respective bit is set in each bit vector only if the critical function is executed in the path. Each respective bit further points to a parameter values recorded for that critical function. As a result, the technique described herein efficiently stores and utilizes only minimal amount of information needed to identify the path and utilize the stored data to make an informed decision. In addition, an arbitration module utilizes the recorded data by each critical function of each respective path and applies a logic function, or a logic table, or a combination of both the logic table and a logic function for determining which output results are should be utilized.

An embodiment contemplates a method of arbitrating conflicting outputs in a redundant control system. Execution data of a task executed by each controller in the redundant control system is recorded. The execution data includes an initial timestamp of each execution stream, identification of critical functions in each execution stream, and parameter values used by the critical functions. A path executed by each controller is identified based only on the critical functions executed for each execution stream. The recorded execution data of each executed path is applied to an arbitration module. An output result from one of the respective controllers selecting, by an arbitration module, based on the recorded execution data of each executed path. The output result of the selected controller is communicated to a next module for further processing.

DETAILED DESCRIPTION

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to identify faults in controllers executing software functions in control systems. While the approach and methodology are described below with respect to controllers or processors used in vehicle applications, one of ordinary skill in the art appreciates that an automotive application is merely exemplary, and that the concepts disclosed herein may also be applied to any other suitable communications system such as, for example, general industrial automation applications, manufacturing and assembly applications, and gaming.

The term "vehicle" as described herein can be construed broadly to include not only a passenger automobile, but any other vehicle including, but not limited to, rail systems, planes, off-road sport vehicles, robotic vehicles, motorcycles, trucks, sports utility vehicles (SUVs), recreational vehicles (RVs), marine vessels, aircraft, farming vehicles, and construction vehicles.

Figure 1:
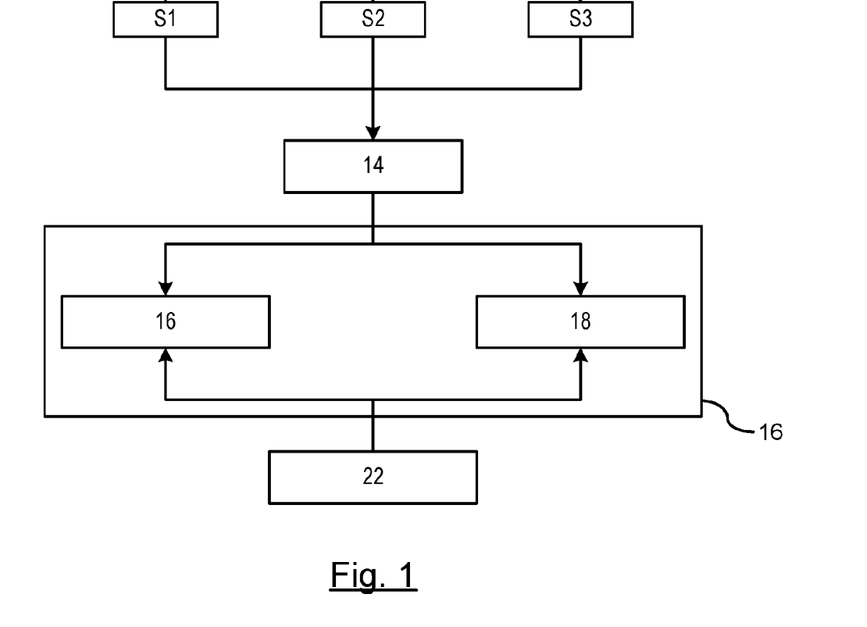
FIG. 1 illustrates an architectural block diagram of an exemplary control system.

There is shown in FIG. 1 an architectural block diagram of an exemplary control system. Such control systems will often utilize two or more controllers so that if a hardware error occurs with a primary controller, then at least one backup controller may be readily enabled to control a feature of the control system or provide control for limited functionality of the feature in error. As shown in FIG. 1, a plurality of sensors is provided for data is obtained by one or more sensors 12. The sensors 12 sense for status condition of a device, subsystem, or system. The sensed data obtained directly from the sensors 12 to a controller for processing or if more than one sensor is utilized, the data may be fused if multiple sensors 12 are used to monitor a condition. As a result, a fusion module 14 may be utilized for fusing the sensor results for putting the data in a better form for processing.

The data either from the fusion module 14 or directly from the sensors 12 are input to a controller 16. The controller 16 may include a plurality of processors or a multi-core processor. As shown in FIG. 1, the controller 16 may include a first processor 18 and a second processor 20 for executing a function based on the input data provided by the plurality of sensors 12 or the fusion module 14. Alternatively, the controller may include a duo-core processor that utilizes a first core and a second core as opposed to individual processors for executing controls. For the consistency purposes herein, the term processor will be used; however, it should be understood that the term processor can be interchanged with a core of a processor. The output from the first processor 18 and the second processor 20 are input to an arbitration module 22 where the results are compared to one another. If the results are the same, then either result may be utilized. If the results are different, then the arbitration module determines which results will be utilized.

Figure 2:
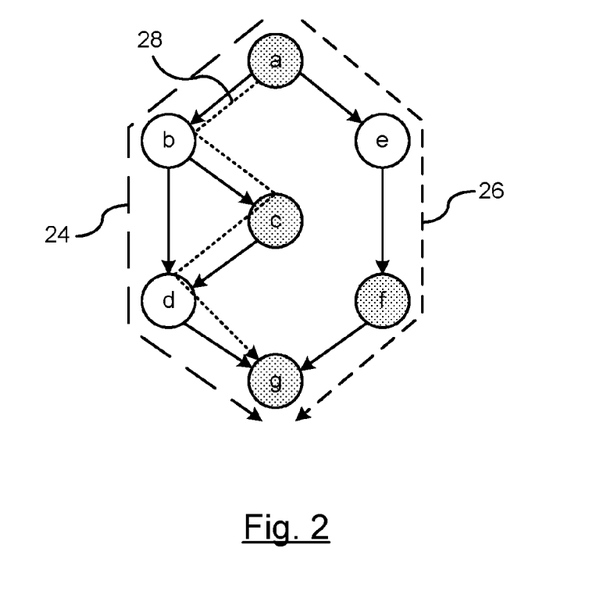
FIG. 2 illustrates a data structure and architecture of used to record an execution sequence of each task.

FIG. 2 illustrates a data structure and architecture of used to record an execution sequence of each task. For example, a task that is executed by various processors may utilize different processing sequences (hereinafter referred to as paths). In FIG. 2, three different paths may be recorded utilizing different paths where functions are recorded at each node. A first path 24 may include functions {a, b, d, g}. A second path 26 may include {a, b, c, d, g}. A third path 28 may include {a, e, f, g}. For each function executed in a path, information is obtained during the execution of the function. Additional information obtained may include, but is not limited to, timestamps and data values of functions, which can be stored and utilized downstream by the arbitration module. However, to record timestamps and value of functions at every node for every path would be inefficient and computationally intensive for processing the recorded information. Therefore, critical functions are identified at design time. By recording information only from the critical functions, not only is the amount of data decreased, but paths may be readily identified by identifying only critical functions as opposed to recording data for all functions.

For each critical function identified in a path that is executed a timestamp at the initiation and execution of a path is recorded, and data values are recorded for each critical function executed. The data value may include one or more parameter values. In FIG. 2, functions (a, c, f, g) are identified as critical elements. It was earlier described that three possible paths are feasible. Since function (a) is the starting node and function (g) is the ending node, each of these respective functions will be part of each path. Therefore, a presence of a respective function or an absence of a respective function may determine which path is taken. For example, if function (c) and function (f) are also identified as critical functions, the presence of either functions (c) or (f), or the absence of both functions will identify the path. Therefore a table may be utilized to record values used for all critical functions in determining which data is associated with which path when analyzed by the arbitration module. If the table for a respective path records values for critical function (c), then a determination may be made that the path is the second path 26 {a, b, c, d, g}. If the table for a respective path records a value for critical function (f), then a determination may be made that the path is the third path 28 {a, e, f, g}. If the table for a respective path does not record a value for either critical functions (c) and (f), then a determination is made that the path is the first path 24 {a, b, d, g}. As result, each path may be determined based on whether values are recorded for critical functions. Values may then be provided to the arbitration module where an arbitration policy is executed utilizing a lookup table or decision logic which will be discussed in detail later.

Figure 3:
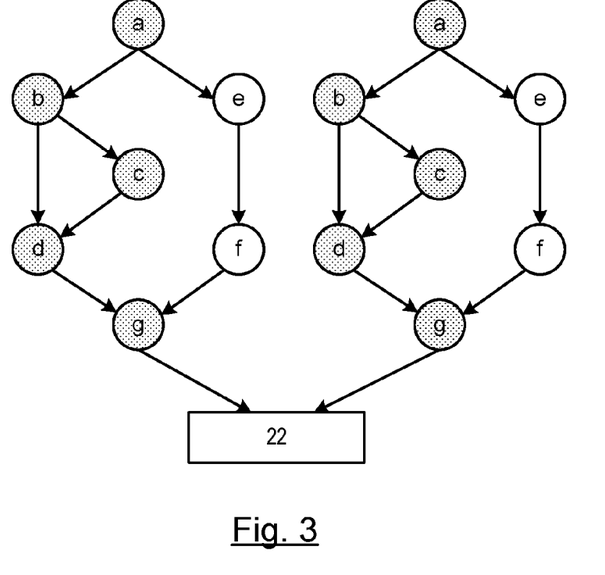
FIG. 3 illustrates a first example of two processors executing respective functions and outputting results according to the functions

FIG. 3 illustrates a first example of two processors executing respective functions and outputting results according to the functions. In FIG. 3, identical paths are executed and the results are provided to the arbitration module 22. If the results are the same, then either result may be utilized by the arbitration module since the results are the same. If the results are different even though the same path is utilized by both processors, then a determination as to which processor is correct is determined utilizing the various properties including the recorded parameter values.

Figure 4:
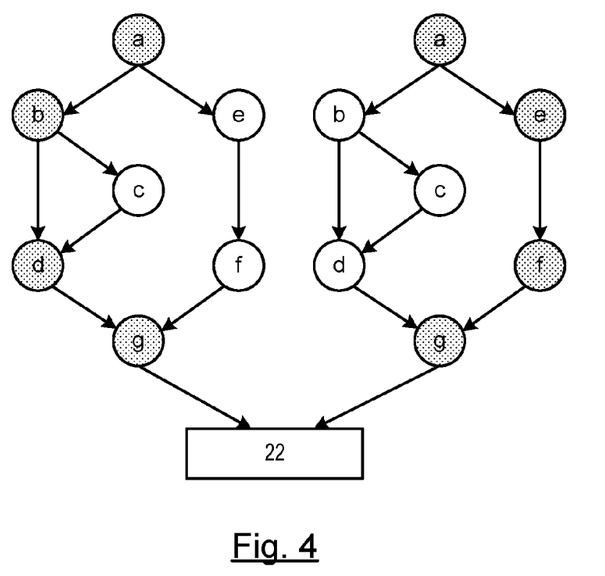
FIG. 4 illustrates a first example of two processors executing respective functions via different paths yielding different results.

FIG. 4 illustrates a first example of two processors executing respective functions via different paths yielding different results. In this example, the first processor executes paths {a,b,d,g} and the second processor executes path {a,e,f,g}. Depending on the arbitration logic, a predetermined path may be identified utilizing at least one of a timestamp, the path executed, and the parameter values utilized. The arbitration module 24 will receive the parameter values of the associated path and will utilize at least one of the timestamps, execution sequence (i.e., path) and parameter values for determining which path yields the correct result. The arbitration module 22 may utilize a lookup table or decision logic for identifying the result to use.

Figure 5:
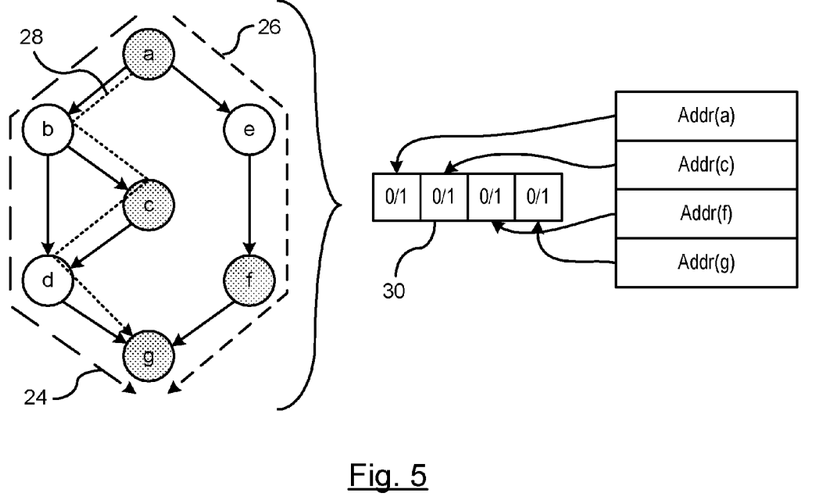
FIG. 5 illustrates a data structure utilized by the arbitration module.

FIG. 5 illustrates a data structure utilized for recording the executed sequence in a manner that can be used by the arbitration module and is formatted for minimizing the amount of data that is required to be retained and processed. As shown in FIG. 5, each of the critical functions {a,c,f,g} are captured as a bit in a vector. Each path will utilize the vector that not only provides the execution sequence of the path but also includes a function visitation indicator. The function visitation indicator is a bit (i.e., "1" or "0") that identifies whether a respective function is visited along a respective path. As set forth earlier, critical functions are identified in the plurality of functions. Each critical function is set forth in a vector along with their associated function visitation indicator. Construction of a 4 bit vector 30 is shown in FIG. 5. Utilizing the critical functions of FIG. 5, each function is represented in the 4-bit vector 30. For example, Addr (a) is represented by the first slot of the vector, Addr(c) is shown by the second slot of the vector, Addr(f) is shown by the third slot of the vector, and Addr (g) is shown by the fourth slot of the vector. Each respective address will include a "0" bit or a "1" bit. A "0" bit indicates that the respective node was not visited and the function was not executed. A "1" bit indicates that the respective node was visited and therefore the function was executed. Therefore, each execution sequence for each path will include information that not identifies the path by indicating whether respective nodes were visited and functions executed once the execution sequence reaches its destination. As a result, each path will be represented by an initial timestamp and a path flag indicator. The initial timestamp represents a start of a path and is used to match signals for arbitration. The path flag vector is designed with each of the critical functions, whether on a same or different execution path, represented by bit vector where each bit indicates the visit of a function on the execution path. Each of the bits are initially unset (i.e., "0") at the initial timestamp and each bit is set (i.e., "1") when the function it represents is executed. If a function is not executed, its associated bit remains unset (i.e., "0"). The order of the functions of the vector is consistent with the order of the execution sequence for any path.

Figure 6:
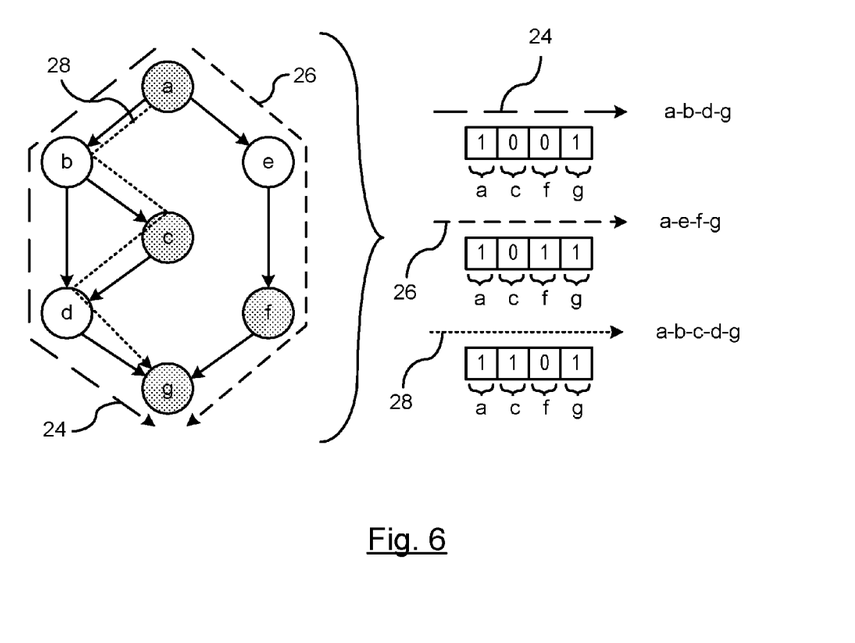
FIG. 6 represents exemplary paths and their associated path flag vector

FIG. 6 represents exemplary paths and their associated path flag vector, respectively. As shown in FIG. 6, critical functions include {a,c,f,g}. Each 4-bit vector is utilized having the order {a,c,f,g}. Each respective dotted line in FIG. 6 represents a different path 24, 26, 28. The first path 24 is identified by a vector having values {1,0,0,1}. The bit values indicate that function (a) is executed, function (c) is not executed, function (f) is not executed, and function (g) is executed. Since neither functions (c) or (f) were executed, then the only feasible path can be {a-b-d-g} which correlates with the first path 24. Similarly, a second path represented by 32 is identified by a vector having values {1,0,1,1}. The bit values indicate that function (a) is executed, function (c) is not executed, function (f) is executed, and function (g) is executed. Since functions (c) is not executed and function (f) is executed, then the only feasible path can be one that includes function (f) which yields path {a-e-f-g}. In addition, a third path represented by 28 is identified by a vector having values {1,1,0,1}. The bit values indicate that function (a) is executed, function (c) is executed, function (f) is not executed, and function (g) is executed. Since functions (c) is executed and function (f) is not executed, then the only feasible path can be one that includes function (c) which yields path {a-b-c-d-g}. Therefore, to reduce the vector size and associated data collected with each function, there is no need to track all functions (e.g., non-critical functions) and record data for all functions of the path. Rather, only critical functions are tracked and data is recorded only for critical function since the critical functions when executed as well as those critical functions not executed will reveal which is the executed path.

To further enhance the determination of identifying the correct result by the arbitration module, values of parameters resulted from executed functions are tracked and analyzed. An inconsistent output between different paths or a same path executed by two different processors can be a result of different values used since an output of a computation path depends on values used by each function. This can be caused by various factors that include, but are not limited to, hardware faults and updates from other functions. This can be particularly challenging when global variables are used. To assist in determining the correct output, a table is generated to record values used in the computation. Each function may utilize one parameter or multiple parameter values. Therefore, the parameter values used only by the critical functions in the execution sequence are recorded.

Figure 7:
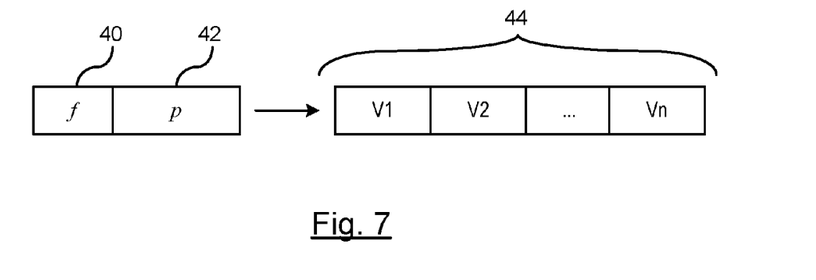
FIG. 7 illustrates an exemplary structure for a function and associated parameter values in an exemplary table.

FIG. 7 illustrates an exemplary structure for a function and its associated parameter values in a table. A function field 40 is shown in the first entry. A pointer field 42 points to where the respective parameter values are recorded. Parameter values are recorded in a parameter value entry field 44. More than one parameter value may be entered in this field if more than one parameter value is utilized by the respective function.

Figure 8:
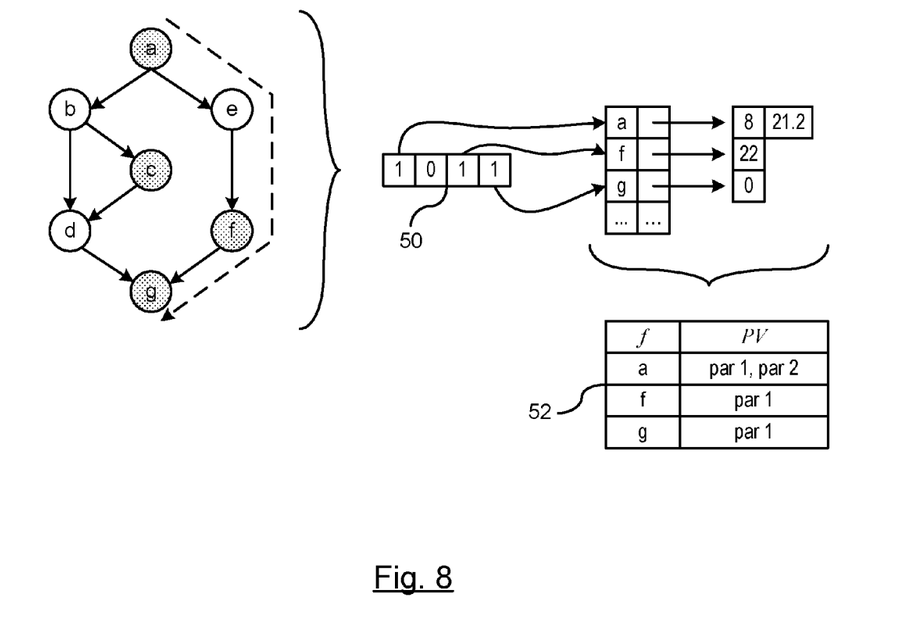
FIG. 8 illustrates a mapping of a path vector to an associated table function entry and associated parameter values.

FIG. 8 illustrates a mapping of a path vector to an associated table function entry and associated parameter values. An exemplary vector is shown generally at 50. Only those respective critical functions that have a bit value that is set have recorded parameter values the table 52. That is, parameter values are recorded only for those respective functions that were executed. If the critical function in the bit vector is "0", then that respective function was not executed, and therefore, that respective function was not part of the execution sequence of the path. As a result, a critical function not executed will not have a parameter value nor will that critical function not executed be listed in the table 52. It should be understood that the order in the table is the same as the order in which the function appears in the vector (less any critical functions not executed).

Referring to the path vector 50, the first bit of the path vector 50, which represents function (a) is set and therefore has at least one associated parameter value in the table 52. As shown in the table 52, function (a) utilizes parameter values "8" and "21.2". The second bit of the path vector 50, which represents function (c) is not set and therefore does not have a corresponding entry or parameter value in the table 52. The third bit of the path vector 50, which represents function (f) is set and therefore has at least one associated parameter value in the table 52. As shown in table 50, function (f) utilizes parameter value "22". Similarly, the fourth bit of the path vector 50, which represents function (g) is set and therefore has at least one associated parameter value in the table 52. As shown in table 52, function (g) utilizes parameter value "0". It should be understood that not every bit in the path vector will necessarily have an entry in the table, and not every parameter value is recorded. That is, while non-critical functions are utilized and executed in a respective path, only the critical functions that are executed are recorded by the arbitration module for determining which path provides the correct output.

After each table is generated for each path, the arbitration module compares various factors either individually or in combination that include timestamp, the path utilized, and parameter values.

Figure 9:
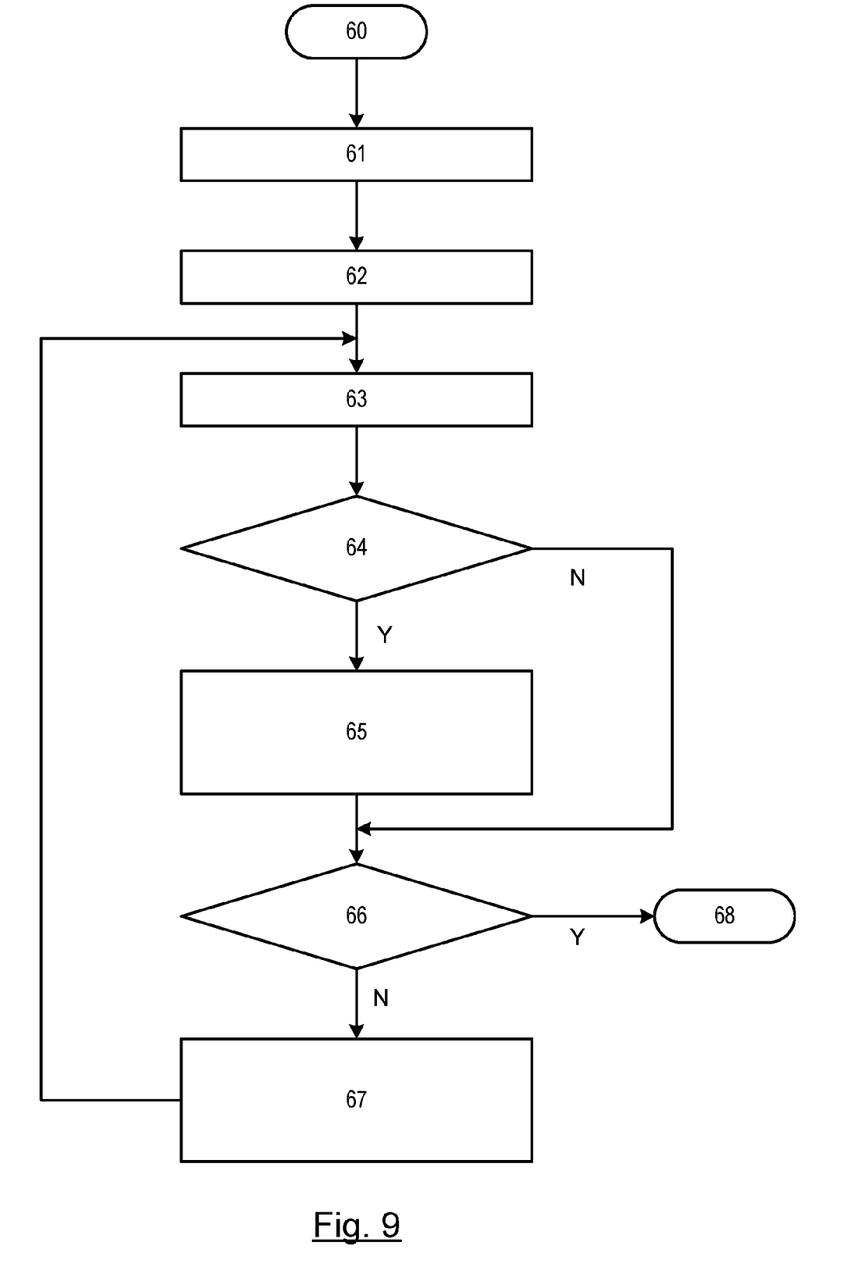
FIG. 9 illustrates a flowchart of a process to record execution paths and values.

FIG. 9 illustrates a flowchart of a process to record execution paths and values. In step 60, a routine for recording the execution path and parameter values of each function is initiated. In step 61, an initial timestamp is recorded with the data for a vector. This timestamp may be inherited from the fused sensor data.

In step 62, critical functions of the different paths for a list are identified and are initiated for storage. A list head is used to indicate a beginning of a list.

In step 63, an address is set as the current function address. That is, an address for the node of which current function is being executed is set as the current address.

In step 64, a determination is made as to whether the current address is part of a current list. It should be recalled all functions whether critical or non-critical are executed in an execution string; however, the routine only records data for critical functions. If the current address is part of the current list representing a critical function, then the routine proceeds to step 65; otherwise the routine proceeds to step 66.

In step 65, the function is identified as a critical function and parameter values are recorded for this critical function while being executed.

In step 66, a determination is made whether the execution string is complete. If the determination is made that no additional functions need to be executed, then the routine proceeds to step 68 where the routine ends. If the determination is made that the execution string is not complete and that additional functions require execution, then the routine proceeds to step 67.

In step 67, the routine identifies the next function in the execution string and the routine returns to step 63 to set this next function as the current function address.

It should be understood that functions may be called multiple times in a calling tree for execution and each time that a function is called is treated as a different function because only one path of a program will be executed and the functions executed on any path are done so sequentially. After a check is considered for each function as to whether it is critical or non-critical, only respective functions that are identified as critical.

Figure 10:
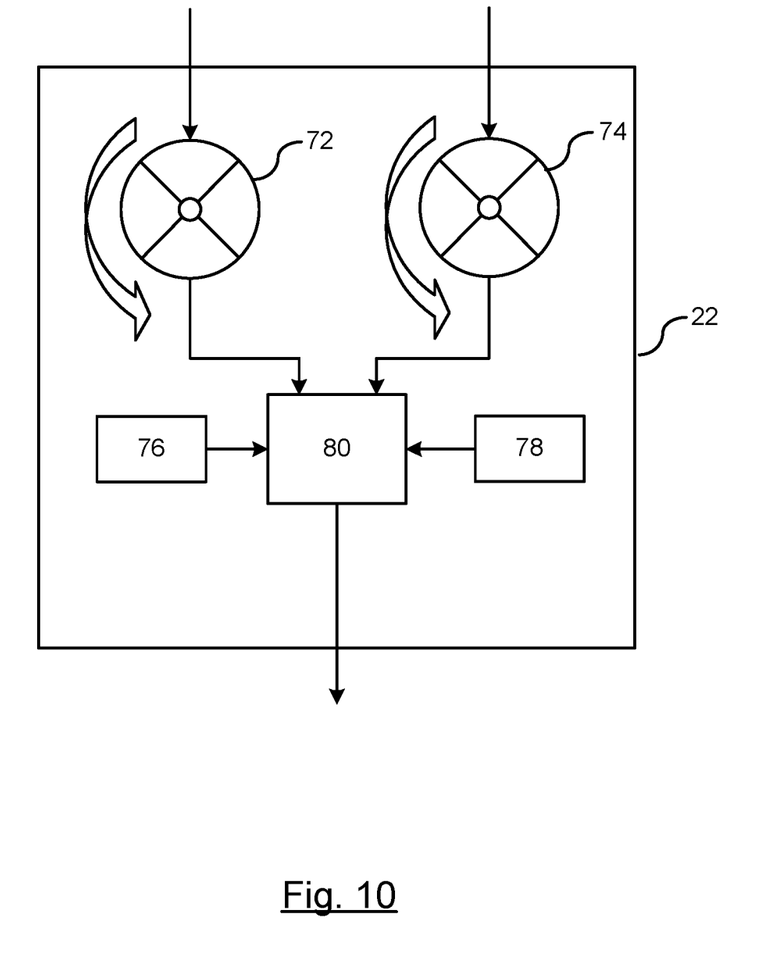
FIG. 10 illustrates an exemplary structure of an arbitration module used to execute an arbitration strategy.

FIG. 10 illustrates an exemplary arbitration module 22 used to execute an arbitration strategy. The arbitration module 22 includes a first circular storage buffer 72 and a second circular storage buffer 74. Data such as timestamp, executed path, and parameter values are input to a respective buffer based on the number of processors executing redundant operations. It should be understood that the number of buffers will typically equal the number of redundant processors executing functions. Therefore, while the exemplary arbitration module 22 illustrates two circular buffers, more buffers may be utilized if more than two redundant processor are utilized. Each circular buffer for each redundant processor stores a short history of values (e.g., 3 values—1 current value, and 2 previous values). When the outputs of the processor disagree, the arbitration module 22 utilizes various factors and compares these respective factors from the redundant processors. The arbitration logic in the arbitration module 22 is determined at design time and is stored for runtime use.

The arbitration module 22 includes a logic function 76 where the criteria relied on by the arbitration module 22 may be weighted according to the function utilized for identifying a decision. In addition, the arbitration module 22 includes a lookup table 78. The lookup table 78 provides fixed decisions based on the input values.

The arbitration module 22 further includes a decider 80 that utilizes a combination of the decisions derived by the strategy of the logic function 76 and the lookup table 78.

The logic function 76 may be represented by the following formula:

$$De = \max_{i=1}^{n}(w_1 T_i + w_2 P_i + w_3 v_i)$$

where $T_i$ is a timestamp output of path i, $P_i$ is a preference of an output of path i, $v_i$ is preference of output value used on path i, $w_1, w_2, w_3$ are weights for importance of each factor. Each of the weights may be predetermined at design time and will vary according to the function being executed or a range that the function is being operated in. For example, if the function relates to a speed of a vehicle, a weighting factor $w_1$ for the preference of value output $v_i$ may be 50%, whereas if the function relates to engine torque, the weighting factor $w_1$ for the preference of value output $v_i$ may be 75%. In another example, a steering operation is based on the speed of the vehicle. A vehicle speed parameter at 65 mph may have a different weight than a vehicle speed parameter of 75 as the vehicle speed may affect what the steering angle should be set to. As a result, the weights applied to different outputs are preset based on the function being executed.

Referring to the timestamp factor, a timestamp $T_i$ taken at a respective time may be more preferential or critical when taken at a respective time. As a result, greater weight may be applied to the timestamp parameters as opposed to the path or parameter values when the condition requires it.

Referring to the path factor, greater emphasis may be placed on path that utilizes more critical functions relative to another path. A strategy may be applied that the more critical functions that are executed for a respective path, the greater the confidence or reliability of the output from that respective path.

Referring to parameter values used by a respective function, greater emphasis may be applied to parameters that are within a respective parameter operating range or within a respective distance from a parameter target value.

Based the various factors as described herein, different weighting factors may be utilized in the logic function 76.

The lookup table 78 represents fixed decisions based on the differences between various factors described above such as timestamps, paths, and parameter values. Differences may include the difference of the timestamps of the comparing paths or between a target timestamp, the differences between the executed paths such as the critical functions, and the differences between the parameter values of the comparing paths or to a parameter target value. Based on the comparisons of each category, a fixed decision output is applied. An exemplary lookup table is shown as follows:

| T-diff range | P-diff | pointer | Decision |
| --- | --- | --- | --- |
| [0,1] | abcdg, abdg | V1[0, 10] | O(P1) |
| [0,3] | abdg, aefg | V1[0,4], v2[1,10] | Omax |

The decider 80 may utilize only the results from the logic function 76, only the results of lookup table 78, or a respective combination of the logic function 76 and the lookup table 78 in determining which output results should be relied on an provided to other modules for additional processing. Additional modules may include, but is not limited to, other controllers, devices, subsystems, or systems. This information may be utilized to execute further tasks, or may be used to enable a vehicle operations based on the output results.

While certain embodiments of the present invention have been described in detail, those familiar with the art to which this invention relates will recognize various alternative designs and embodiments for practicing the invention as defined by the following claims.

What is claimed is:

1. A method of arbitrating conflicting outputs in a redundant control system, the method comprising the steps of:
   recording execution data of a task executed by each controller in the redundant control system, the execution data including an initial timestamp of each execution stream, identification of critical functions in each execution stream, and parameter values used by the critical functions;
   identifying a path executed by each controller based only on the critical functions executed for each execution stream;
   applying the recorded execution data of each executed path to an arbitration module;
   selecting, by an arbitration module, an output result from one of the respective controllers based on the recorded execution data of each executed path; and
   communicating the output result of the selected controller to a next module for further processing.

2. The method of claim 1 wherein selecting the output result is performed by a decider within the arbitration module, wherein at least one of a logic function or a lookup table is used by the decider to select the output result.

3. The method of claim 2 wherein the logic function is represented as follows:

$$De = \max_{i=1}^{n}(w_1 T_i + w_2 P_i + w_3 v_i)$$

where $T_i$ is a timestamp output of path i, $P_i$ is a preference of an output of path i, $v_i$ is preference of output value used on path i, $w_1, w_2, w_3$ are weights for importance of each of $T_i$, $P_i$, and $v_i$ respectively.

4. The method of claim 2 wherein the lookup table includes fixed outputs based on comparative factors in the lookup table.

5. The method of claim 4 wherein the comparative factors of the lookup table include a timestamp output of path i.

6. The method of claim 4 wherein the comparative factors of the lookup table include a preference of an output of path i.

7. The method of claim 4 wherein the comparative factors of the lookup table include a preference of output value used on path i.

8. The method of claim 2 wherein the decider module utilizes a combination of the logic function and the lookup table.

9. The method of claim 2 wherein the initial timestamp is obtained from fused sensor data.

10. The method of claim 1 wherein identifying a path executed by each controller based only on the critical functions comprises the steps of:
    identifying all critical functions used in all paths by each controller;
    tracking only the identified critical functions in each path;
    generating a bit vector for each path, each bit vector represented by only by the critical functions, wherein each bit in each bit vector represents whether a respective critical function is executed for the respective task.

11. The method of claim 10 wherein a respective bit of each bit vector is set if the function is executed in a respective path and is unset if the function is not executed in the respective path.

12. The method of claim 11 wherein each of the bits in each respective bit vector are initially unset at the initial timestamp.

13. The method of claim 10 wherein all critical functions are predetermined.

14. The method of claim 10 wherein at least one parameter value is recorded for each bit set in each bit vector.

15. The method of claim 14 wherein a parameter table is generated for each path as a function of recorded parameter values, wherein only critical functions executed in a respective path are listed as entries in a respective parameter table, and wherein parameter values utilized by the executed critical functions are recorded in the parameter table.

16. The method of claim 15 wherein more than one parameter is recorded for an executed critical function.

17. The method of claim 1 wherein each initial timestamp is attached to a respective bit vector.

18. The method of claim 1 wherein each set of recorded execution data obtained from each path is provided to a respective circular buffer of the arbitration module, each circular buffer is in communication with the decider module wherein stored data from each circular buffer is provided to the decider.

19. The method of claim 1 wherein each circular buffer stores a predetermined amount of data.

20. The method of claim 19 wherein each circular buffer stores a current data value and two previous data values.

* * * * *